US006955091B2

United States Patent
Fujimoto et al.

(10) Patent No.: US 6,955,091 B2
(45) Date of Patent: Oct. 18, 2005

(54) PRESSURE SENSOR APPARATUS

(76) Inventors: Seizo Fujimoto, c/o Mitsubishi Electric Engineering Co., Ltd., 6-2, Ootemachi 2-chome, Chiyoda-ku, Tokyo 100-0004 (JP); Hisato Umemaru, c/o Mitsubishi Electric Engineering Co., Ltd., 6-2, Ootemachi 2-chome, Chiyoda-ku, Tokyo 100-8310 (JP)

( * ) Notice: Subject to any disclaimer, the term of this patent is extended or adjusted under 35 U.S.C. 154(b) by 14 days.

(21) Appl. No.: 10/652,339

(22) Filed: Sep. 2, 2003

(65) Prior Publication Data
US 2004/0231426 A1 Nov. 25, 2004

(30) Foreign Application Priority Data
May 19, 2003 (JP) ........................................ 2003-140770

(51) Int. Cl.[7] .................................................. G01L 9/02
(52) U.S. Cl. ...................................................... 73/756
(58) Field of Search ................................ 257/417, 418, 257/419; 73/756, 719, 705

(56) References Cited

U.S. PATENT DOCUMENTS

| | | | |
|---|---|---|---|
| 5,126,813 A | * | 6/1992 | Takahashi et al. ........... 257/417 |
| 5,225,373 A | * | 7/1993 | Takahashi et al. ............ 438/51 |
| 5,394,751 A | * | 3/1995 | Ishibashi ..................... 73/756 |
| 6,453,747 B1 | | 9/2002 | Weise et al. |
| 6,521,966 B1 | * | 2/2003 | Ishio et al. .................. 257/417 |
| 6,615,669 B1 | * | 9/2003 | Nishimura et al. ........... 73/756 |

FOREIGN PATENT DOCUMENTS

| | | |
|---|---|---|
| DE | 100 22 124 A1 | 11/2001 |
| DE | 102 02 901 A1 | 8/2002 |
| JP | 61-96346 U | 6/1986 |
| JP | 2000-329632 | 11/2000 |
| JP | 2000-337987 A | 12/2000 |
| JP | 2001-21431 A | 1/2001 |
| JP | 2002-228535 | 8/2002 |
| JP | 2003-086761 | 3/2003 |
| WO | WO 03/036251 A1 | 5/2003 |

* cited by examiner

*Primary Examiner*—William Oen
*Assistant Examiner*—Andr Allen
(74) *Attorney, Agent, or Firm*—Sughrue Mion, PLLC

(57) ABSTRACT

A pressure sensor apparatus is substantially miniaturized by utilizing dead space. A sensor element is arranged to be present in a medium for detecting the pressure of the medium. A control element serves to control an electric signal from the sensor element, and a power supply element serves to control an input from the power supply and a signal from the control element thereby to generate an output. A lead frame has the control element and the power supply element mounted thereon and serves as an electrical conduction path. A resin body is formed by integrating the control element, the power supply element and the lead frame with one another. Either one of the sensor element, the control element and the power supply element is arranged on one side surface of the lead frame, and the remaining two are arranged on the other side surface of the lead frame.

14 Claims, 6 Drawing Sheets

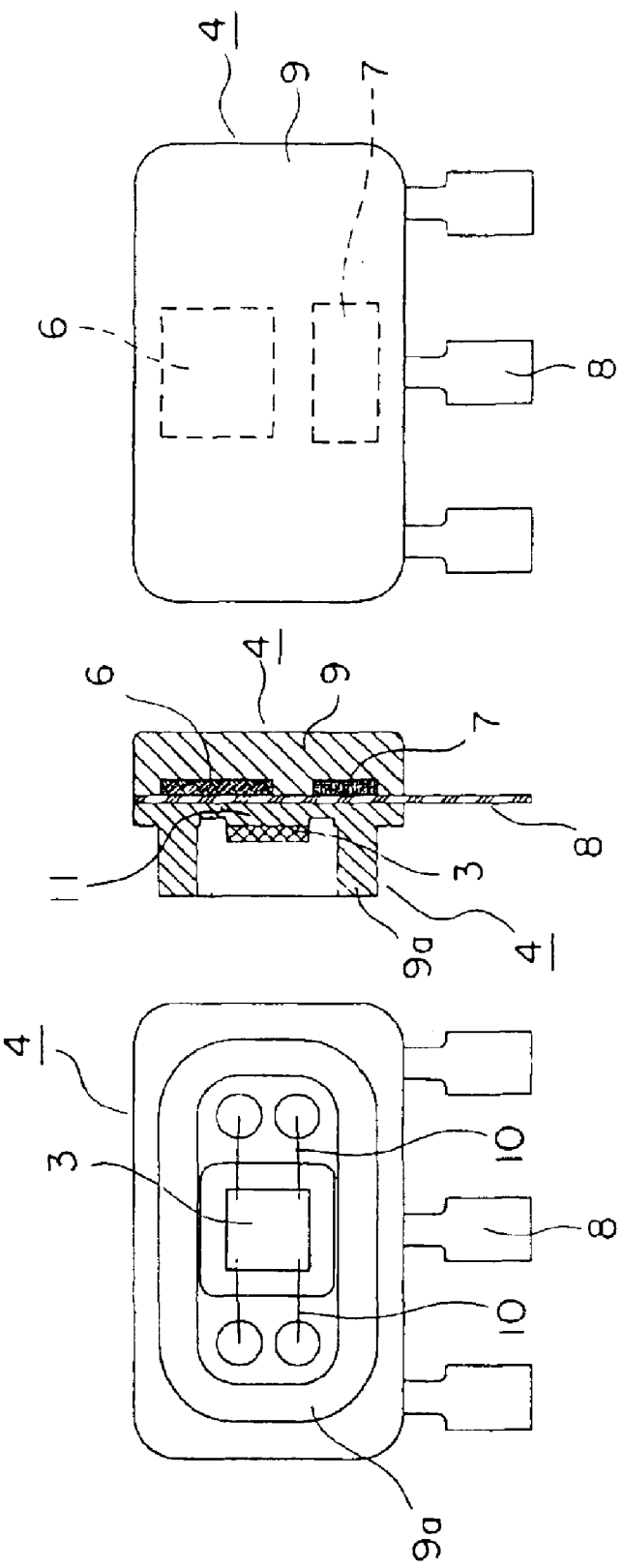

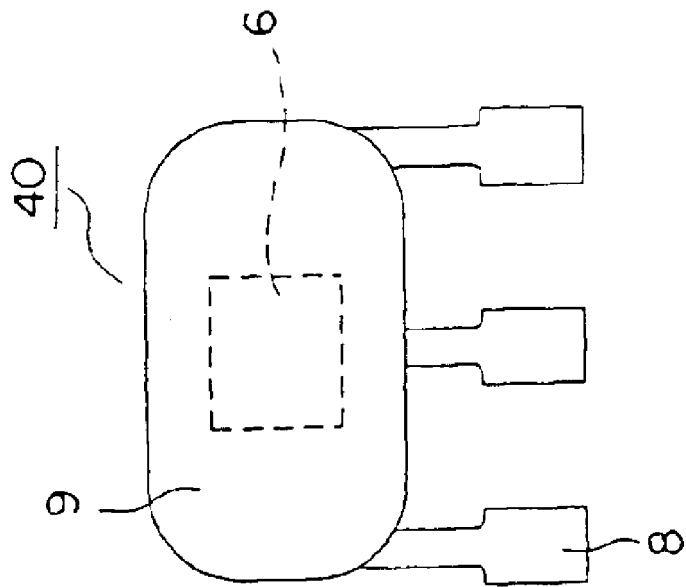
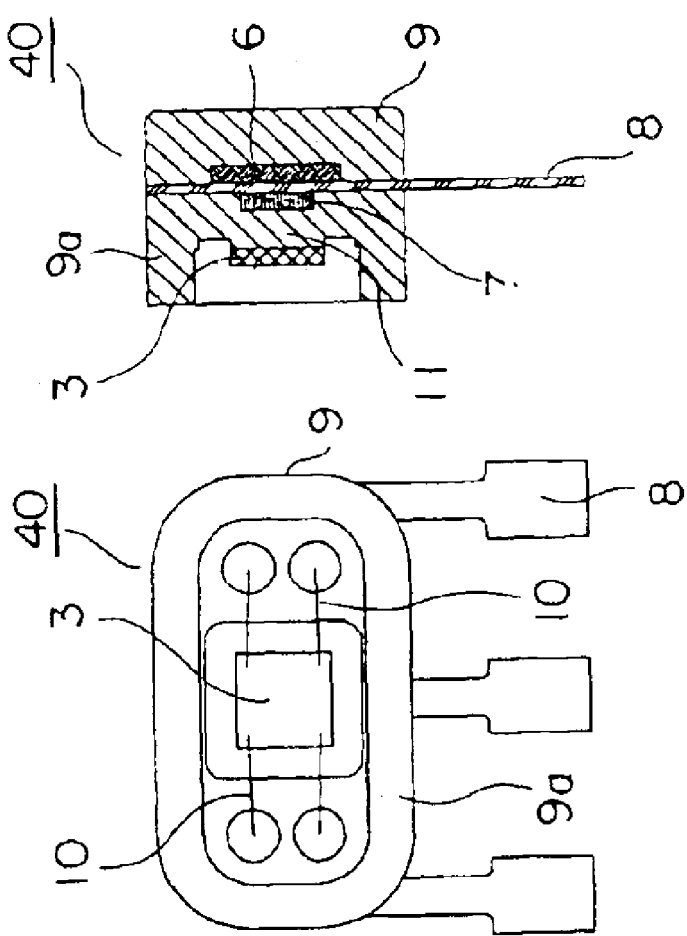

PRESSURE SENSOR APPARATUS

BACKGROUND OF THE INVENTION

1. Field of the Invention

The present invention relates to a pressure sensor apparatus for detecting the pressure of combustion gas in an intake manifold of an internal combustion engine for instance.

2. Description of the Related Art

There has hitherto been known a pressure sensor apparatus which includes a sensor element in the form of a gauge resistor arranged to be present in a medium, the pressure of which is to be detected, for detecting the pressure of the medium, a control element for controlling an electric signal from the sensor element, a power supply element for controlling an input from a power supply and a signal from the control element thereby to generate an output, a lead frame having the control element and the power supply element mounted thereon and serving as an electrical conduction path, and a resin body that is formed by integrating the control element, the power supply element and the lead frame with one another. All the sensor element, the control element and the power supply element are arranged at the same side of the lead frame (for instance, see a first patent document: Japanese patent application laid-open No. 2000-337987).

In the pressure sensor apparatus of the above-mentioned configuration, since all of the sensor element, the control element and the power supply element are arranged on the same side of the lead frame, there arises a problem that the pressure sensor apparatus is enlarged in its planar configuration thereby to increase its overall size.

SUMMARY OF THE INVENTION

The present invention is intended to obviate the above-mentioned problem, and has for its object to provide a pressure sensor apparatus which is substantially reduced in size by utilizing dead space.

In order to achieve the above object, a pressure sensor apparatus according to a first aspect of the present invention is constructed as follows. That is, a sensor element in the form of a gauge resistor is arranged to be present in a medium, the pressure of which is to be detected, for detecting the pressure of the medium. A control element serves to control an electric signal from the sensor element, and a power supply element controls an input from a power supply and a signal from the control element thereby to generate an output. A lead frame has the control element and the power supply element mounted thereon, and serves as an electrical conduction path. A resin body is formed by integrating the control element, the power supply element and the lead frame with one another. Any one of the sensor element, the control element and the power supply element is arranged at one side surface of the lead frame, with the remaining two being arranged on the other side surface of the lead frame. With the above arrangement, it is possible to achieve substantial reduction in the size of the apparatus by using dead space for example.

In addition, a pressure sensor apparatus according to a second aspect of the present invention is constructed as follows. That is, a sensor element in the form of a gauge resistor is arranged to be present in a medium, the pressure of which is to be detected, for detecting the pressure of the medium. A control element serves to control an electric signal from the sensor element. A power supply element serves to control an input from a power supply and a signal from the control element thereby to generate an output. A lead frame has the control element and the power supply element mounted thereon and serves as an electrical conduction path. A resin body is formed by integrating the control element, the power supply element and the lead frame with one another. The lead frame has an exposure portion at which a portion thereof between the sensor element and the control element and between the sensor element and the power supply element is exposed outside. The exposure portion is bent into a U-shaped configuration so that the sensor element is arranged to overlap with the control element and the power supply element. With this arrangement, too, substantial miniaturization of the apparatus as whole can be achieved by utilizing dead space.

Moreover, a pressure sensor apparatus according to a third aspect of the present invention is constructed as follows. That is, a sensor element in the form of a gauge resistor is arranged to be present in a medium, the pressure of which is to be detected, for detecting the pressure of the medium. A control element serves control an electric signal from the sensor element. A power supply element serves to control an input from a power supply and a signal from the control element thereby to generate an output. A terminal has the control element and the power supply element mounted thereon for outputting a signal from the power supply element to the outside. A resin body is formed by integrating the control element, the power supply element and the terminal with one another. With this arrangement, it becomes unnecessary to employ a process of welding a lead frame and a terminal with each other, whereby the number of the component parts can be reduced, and workability can be improved as well.

The above and other objects, features and advantages of the present invention will become more readily apparent to those skilled in the art from the following detailed description of preferred embodiments of the present invention taken in conjunction with the accompanying drawings.

BRIEF DESCRIPTION OF THE DRAWINGS

FIG. 2A is a front elevational view of a sensor module shown in FIG. 1;

FIG. 2B is a cross sectional view of the sensor module shown in FIG. 1;

FIG. 2C is a rear view of the sensor module shown in FIG. 1;

FIG. 3A is a front elevational view of a sensor module according to a second embodiment of the present invention;

FIG. 3B is a cross sectional view of the sensor module shown in FIG. 3A.;

FIG. 3C is a rear view of the sensor module shown in FIG. 3A;

DESCRIPTION OF THE PREFERRED EMBODIMENTS

Now, preferred embodiments of the present invention will be described in detail while referring to the accompanying drawings. Throughout the following embodiments of the present invention, the same or corresponding members or parts as those in the aforementioned known apparatus are identified by the same symbols.

Embodiment 1.

Figure 1:
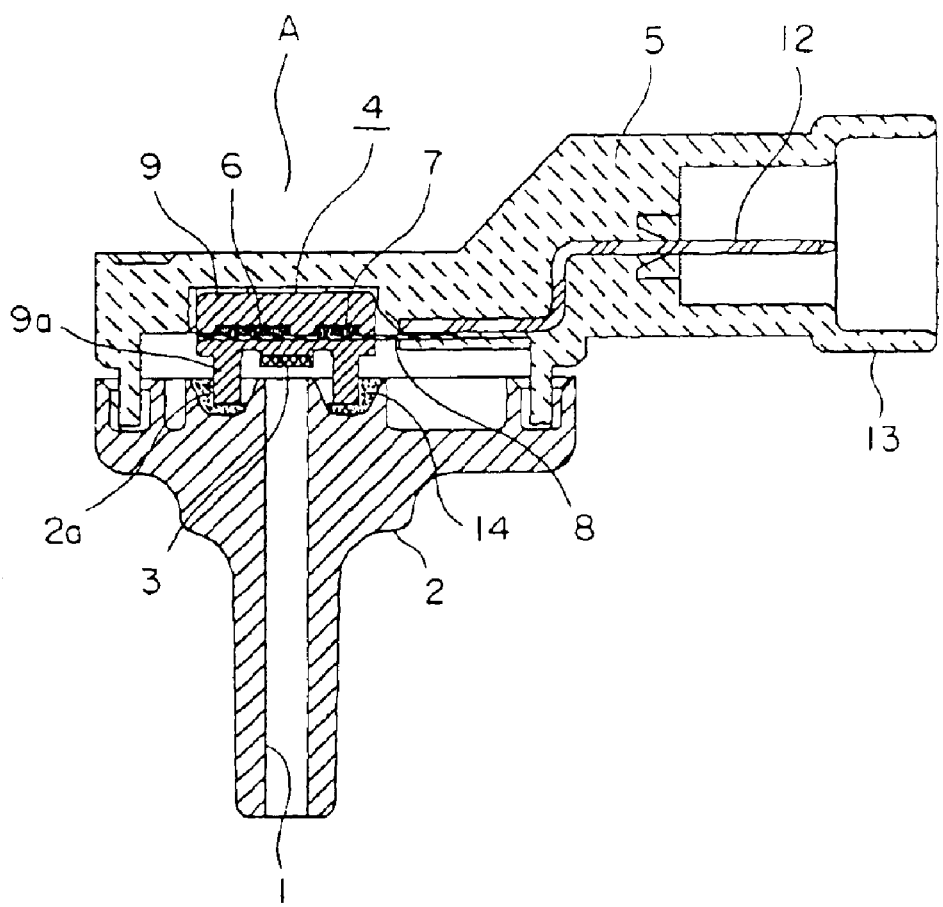
FIG. 1 is a cross sectional view of a pressure sensor apparatus according to a first embodiment of the present invention.

FIG. 1 is a cross sectional view of a pressure sensor apparatus according to a first embodiment of the present invention. FIG. 2A is a front elevational view of a sensor module 4 shown in FIG. 1, and FIG. 2B is a cross sectional view of the sensor module 4 shown in FIG. 1. FIG. 2C is a rear view of the sensor module 4 shown in FIG. 1.

The pressure sensor apparatus includes a base 2 having a vent hole 1, the sensor module 4 having a sensor element 3 in the form of a gauge resistor arranged to be present in the vent hole 1 for detecting the pressure of a medium such as combustion gas in the vent hole 1, and a casing 5 having the sensor module 4 enclosed therein.

The sensor module 4 includes: a control element 6 composed of a semiconductor and controlling an electric signal from the sensor element 3; a power supply element 7 for controlling an input from the power supply and a signal from the control element 6 thereby to generate an output; a lead frame 8 having the control element 6 and the power supply element 7 mounted thereon, and serving as an electrical conduction path; a resin body 9 that is formed by integrating the control element 6, the power supply element 7 and the lead frame 8 with one another through insert molding such as, for instance, transfer molding of an epoxy resin; and a wire 10 that electrically connects the lead frame 8, which is formed of a plate material by means of stamping molding, and the sensor element 3 with each other.

A wall 9a of a circular cross section protruding at a side of the base 2 is formed on the circumference of a seat 11 of the resin body 9, and a groove portion 2a is formed at an end face of the base 2 in a manner as to surround the vent hole 1. The wall 9a is joined to the groove portion 2a through an adhesive 14.

The sensor element 3 in the form of the gauge resistor, being mounted on the seat 11, is arranged on one side surface of the lead frame 8, whereas the control element 6 and the power supply element 7 are arranged on the other side surface of the lead frame 8.

A terminal 12, being bent at an intermediate portion thereof, is embedded in the casing 5. This terminal 12 comprises a terminal of a connector 13, and the terminal 12 has one end portion thereof connected through welding with the lead frame 8. The connector 13 is fitted into a female connector (not shown) connected to a control unit of a vehicle.

In the pressure sensor apparatus as constructed above, the sensor element 3 detects the pressure of combustion gas in an intake manifold of an internal combustion engine of the vehicle through the vent hole 1, and generates an electric signal in the form of an amount of voltage variation indicative of the pressure thus detected, by using a reference voltage supplied from the power supply element 7. By correcting factors due to the temperature and a variation of the sensor element 3 in the control element 6, the electric signal from the sensor element 3 is controlled to generate a prescribed voltage value, and thereafter it is amplified by the power supply element 7, and then sent to the control unit (not shown) through the lead frame 8, the terminal 12 and the female connector.

Here, note that in FIG. 1, the engine is arranged at a location under the pressure sensor apparatus, so that the pressure sensor apparatus can be fitted into the intake manifold from an upper side thereof. Therefore, there is room in an upper side space along the plane of FIG. 1 from the pressure sensor apparatus.

Moreover, the size of the height of the pressure sensor apparatus is decided by the connector 13, and in actuality, it becomes the height of the apparatus in the state in which the female connector is fitted into the connector 13.

Since the pressure sensor apparatus is arranged in such a state, the height size of the pressure sensor apparatus according to this embodiment, in which the sensor element 3 is arranged on one side surface of the lead frame 8 with the control element 6 and the power supply element 7 being arranged on the other side surface of the lead frame 8, becomes enlarged as compared with that of the aforementioned known one. However, the loaction at which the enlarged portion is arranged is a dead space A immediately above the sensor element 3, so only the dead space A is narrowed. As a result, in comparison with the known pressure sensor apparatus, the pressure sensor apparatus according to this first embodiment is reduced in the layout thereof to such an extent that the lateral size of the inventive apparatus becomes smaller.

Embodiment 2.

FIG. 3A is a front elevational view of a sensor module 40 in a pressure sensor apparatus according to a second embodiment of the present invention. FIG. 3B is a cross sectional view of the sensor module 40 shown in FIG. 3A. FIG. 3C is a rear view of the sensor module 40.

In this second embodiment, a control element 6 is arranged on one side surface of a lead frame 8, whereas a power supply element 7 is arranged on the other side surface of the lead frame 8 in such a manner as to overlap with the control element 6. A sensor element 3 is arranged immediately above the power supply element 7 on a line perpendicular to the plane or surface of the lead frame 8.

In this pressure sensor apparatus, the control element 6 and the power supply element 7 are first mounted on the opposite sides of the lead frame 8, respectively, and thereafter, the control element 6, the power supply element 7 and the lead frame 8 are integrated with one another by insert molding to form a resin body 9. After this, the sensor element 3 is installed on a seat 11, and the lead frame 8 and the sensor element 3 are then electrically connected with each othe through a wire 10.

According to this pressure sensor apparatus, the control element 6, the power supply element 7 and the sensor element 3 are arranged in a manner as to overlap with one another in a line perpendicular to the lead frame 8. As a result, the lateral size of the apparatus can be made smaller as compared with that of the first embodiment.

Furthermore, although the size of the height of the apparatus becomes larger as compared with that of the first embodiment, such an increase in the height size only narrows the dead space A. Therefore, in comparison with the first embodiment, the pressure sensor apparatus of this second embodiment can be reduced in the layout thereof to such an extent that the lateral size of the apparatus can be made smaller.

Here, note that the power supply element 7 may be arranged on one side surface of the lead frame 8 with the control element 6 being arranged on the other side surface of the lead frame 8 so as to overlap with the power supply element 7, and the sensor element 3 may be arranged immediately above the control element 6 on a line perpendicular to the plane of the lead frame 8.

Embodiment 3.

Figure 4A:
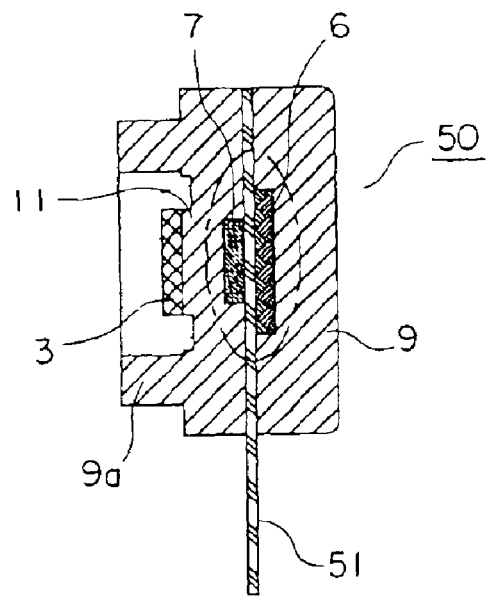
FIG. 4A is a cross sectional view of a sensor module according to a third embodiment of the present invention.
Figure 4B:
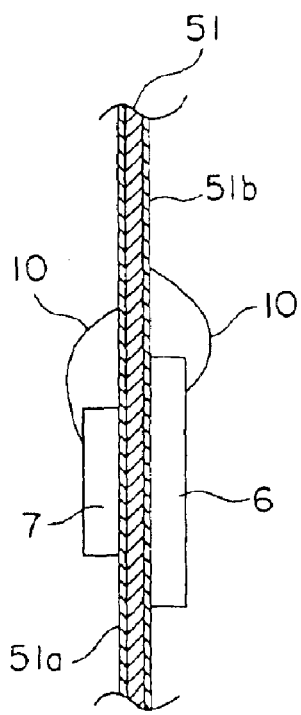
FIG. 4B is a cross sectional view of a lead frame of the sensor module shown in FIG. 4A.

FIG. 4A is a cross sectional view of a sensor module 50 in a pressure sensor apparatus according to a third embodiment of the present invention. FIG. 4B is a cross sectional view of a lead frame 51 shown in FIG. 4A.

In this third embodiment, the lead frame 51 comprises a circuit board having conductive patterns 51a, 51b formed on the opposite surfaces thereof, respectively. A power supply element 7 is electrically connected with the conductive pattern 51a on one side surface of the lead frame 51, and a control element 6 is electrically connected with the conductive pattern 51b on the other side surface of the lead frame 51.

Figure 4C:
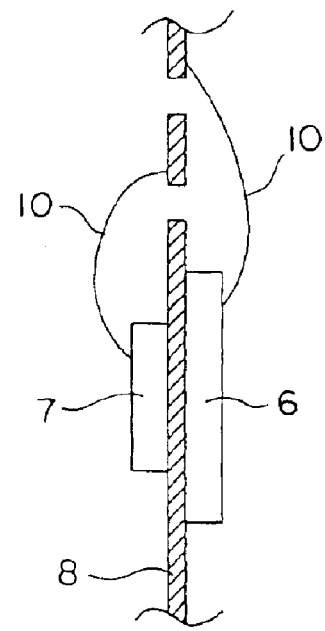
FIG. 4C is a cross sectional view of another example of a lead frame according to the present invention.

The lead frame 8 in each of the first and second embodiments is formed by stamping a metal plate, and is made of a single material with the same or equal potential present on the front and rear surfaces thereof. Accordingly, the control element 6 and the power supply element 7 have different potentials, respectively. As a result, those portions of the lead frame 8 which are electrically connected with the control element 6 and the power supply element 7 through wires 10, respectively, are separated from each other, as shown in FIG. 4C.

In contrast to this, according to the pressure sensor apparatus of this third embodiment, since the circuit board with the conductive patterns 51a, 51b formed on the opposite surfaces thereof is used as the lead frame 51, it is possible to perform wire bonding on the front and rear surfaces of the lead frame 51 at different potentials, respectively, without separating or dividing the lead frame 51 into a plurality of pieces. Therefore, the lead frame 51 can be miniaturized as compared with the lead frames 8 of the first and second embodiments, thus making it possible to reduce the entire size of the pressure sensor apparatus.

Here, note that a flexible circuit board can be used as the lead frame 51, and in this case, thermal stress generated upon welding of the lead frame 51 and a terminal 12 (see FIG. 1) is absorbed by the lead frame 51, whereby the sensor module 50 can be prevented from being damaged due to the thermal stress.

Embodiment 4.

Figure 5:
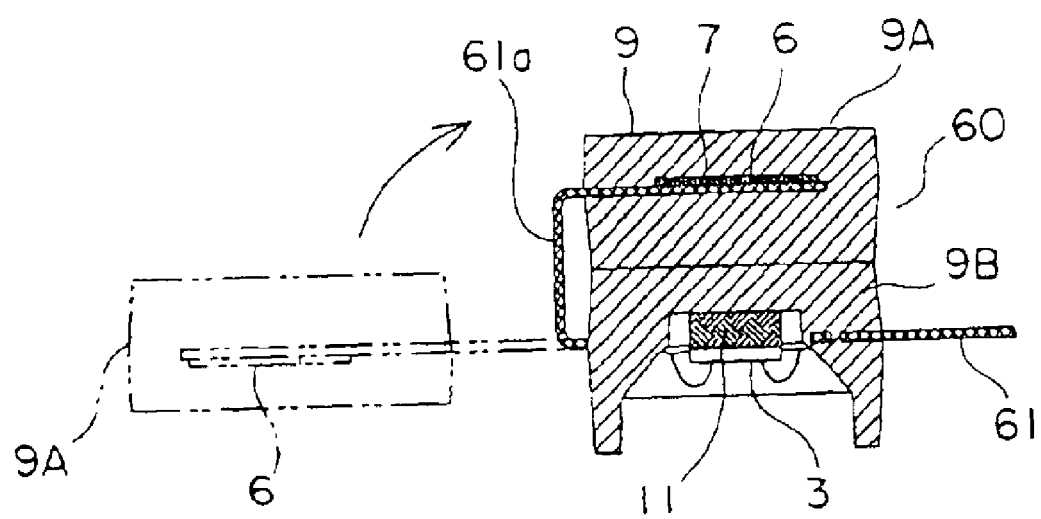
FIG. 5 is a cross sectional view of a sensor module according to a fourth embodiment of the present invention.

FIG. 5 is a cross sectional view of a sensor module 60 in a pressure sensor apparatus according to a fourth embodiment of the present invention.

In this fourth embodiment, a lead frame 61 has an exposure portion 61a between a sensor element 3 and a control element 6 and between the sensor element 3 and a power supply element 7, at which a portion of the lead frame 61 is exposed outside. The exposure portion 61a is bent into a U-shaped configuration so that the sensor element 3 is arranged to overlap with the control element 6 and the power supply element 7.

The lead frame 61 of this pressure sensor apparatus is similar to the lead frames 8 of the first and second embodiments, and hence the control element 6 and the power supply element 7 are installed on an end portion of the planar lead frame 61 and molded with a resin to form a first resin portion 9A by means of insert molding. Also, a second resin portion 9B having a seat 11 integral with the lead frame 61 is formed by insert molding. Thereafter, the exposure portion 61a is bent into a U-shaped configuration so that the first resin portion 9A and the second resin portion 9B are overlapped and joined with each other to form a resin body 9. Finally, after the sensor element 3 is installed on the seat 11, the sensor element 3 and the lead frame 61 are electrically connected with each other through a wire 10.

According to the pressure sensor apparatus of this fourth embodiment, though the height size thereof becomes larger as compared with that of the second embodiment, it is possible to miniaturize the apparatus in terms of the layout thereof to such a extent that the lateral size of the apparatus is able to be reduced in comparison with the aforementioned known pressure sensor apparatus.

Embodiment 5.

Figure 6:
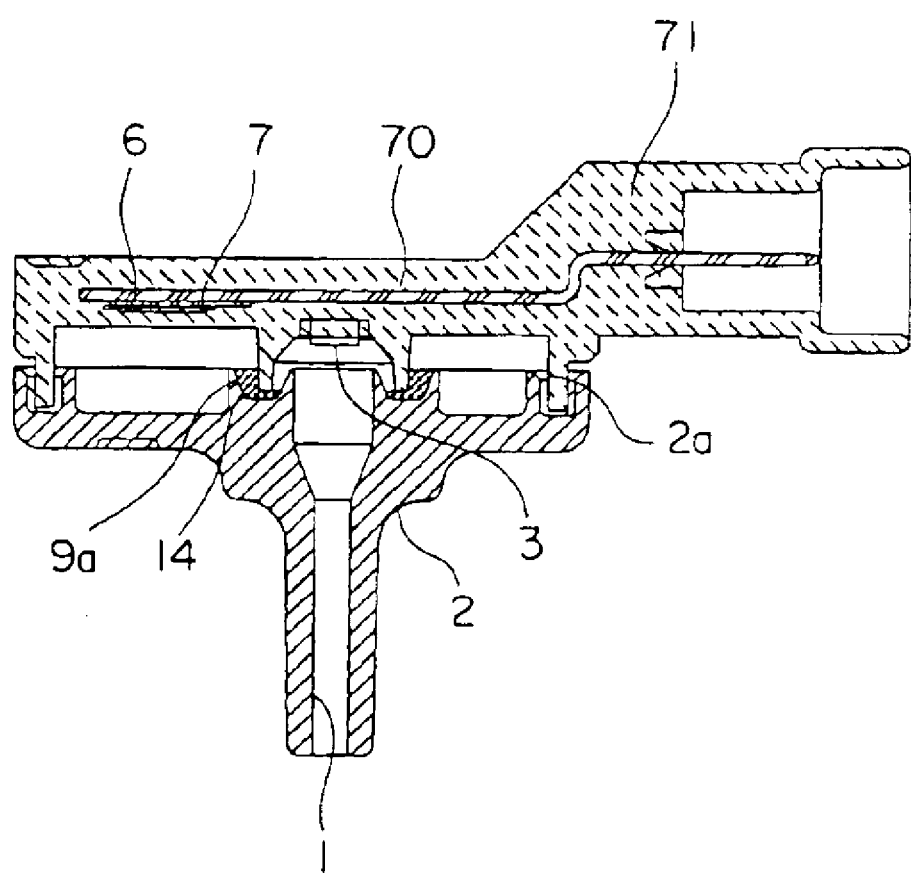
FIG. 6 is a cross sectional view of a pressure sensor apparatus according to a fifth embodiment of the present invention.

FIG. 6 is a cross sectional view of a pressure sensor apparatus according to a fifth embodiment of the present invention.

In this fifth embodiment, a control element 6 and a power supply element 7 are installed on a terminal 70 at which a signal from the power supply element 7 is output to the outside. The control element 6, the power supply element 7 and the terminal 70 are integrated with one another through a resin body 71 by means of insert molding.

According to this pressure sensor apparatus, the terminal 70 plays the role of the lead frame 8 in each of the first through fourth embodiments, so that a sensor module and a lead frame as employed in these embodiments become unnecessary, thus making it possible to omit a process of welding the lead frame and the terminal with each other as well. Accordingly, the number of component parts can be reduced, and workability or manufacturing efficiency can also be improved.

In the above-mentioned first through fourth embodiments, the control element 6, the power supply element 7 and the lead frame 8 or 61 are integrated with one another through the resin body 9 by means of insert molding, but a concave portion may instead be formed in the resin body so that the control element and the power supply element are fitted into the concave portion.

As described in the foregoing, the present invention provides the following excellent advantages.

According to a first aspect of the present invention, there is provided a pressure sensor apparatus including: a sensor element in the form of a gauge resistor arranged to be present in a medium, the pressure of which is to be detected, for detecting the pressure of the medium; a control element for controlling an electric signal from the sensor element; a power supply element for controlling an input from a power supply and a signal from the control element thereby to generate an output; a lead frame having the control element and the power supply element mounted thereon and serving as an electrical conduction path; and a resin body that is formed by integrating the control element, the power supply element and the lead frame with one another. Any one of the sensor element, the control element and the power supply element is arranged at one side surface of the lead frame, with the remaining two being arranged on the other side surface of the lead frame. With the above arrangement, it is possible to achieve substantial reduction in the size of the apparatus by using dead space for example.

In addition, according to a second aspect of the present invention, there is provided a pressure sensor apparatus including: a sensor element in the form of a gauge resistor arranged to be present in a medium, the pressure of which is to be detected, for detecting the pressure of the medium; a control element for controlling an electric signal from the sensor element; a power supply element for controlling an input from a power supply and a signal from the control element thereby to generate an output; a lead frame having the control element and the power supply element mounted thereon and serving as an electrical conduction path; and a resin body that is formed by integrating the control element, the power supply element and the lead frame with one another. The lead frame has an exposure portion at which a portion thereof between the sensor element and the control element and between the sensor element and the power supply element is exposed outside, and the exposure portion is bent into a U-shaped configuration so that the sensor element is arranged to overlap with the control element and the power supply element. With this arrangement, too, substantial miniaturization of the apparatus as whole can be achieved by utilizing dead space.

Moreover, according to a third aspect of the present invention, there is provided a pressure sensor apparatus including: a sensor element in the form of a gauge resistor arranged to be present in a medium, the pressure of which is to be detected, for detecting the pressure of the medium; a control element for controlling an electric signal from the sensor element; a power supply element for controlling an input from a power supply and a signal from the control element thereby to generate an output; a terminal having the control element and the power supply element mounted thereon for outputting a signal from the power supply element to the outside; and a resin body that is formed by integrating the control element, the power supply element and the terminal with one another. With this arrangement, it becomes unnecessary to employ a process of welding a lead frame and a terminal with each other, whereby the number of the component parts can be reduced, and workability can be improved as well.

While the invention has been described in terms of preferred embodiments, those skilled in the art will recognize that the invention can be practiced with modifications within the spirit and scope of the appended claims.

What is claimed is:

1. A pressure sensor apparatus comprising:
   a sensor element in the form of a gauge resistor arranged to be present in a medium, the pressure of which is to be detected, for detecting the pressure of the medium;
   a control element for controlling an electric signal from said sensor element;
   a power supply element for controlling an input from a power supply and a signal from said control element thereby to generate an output;
   a lead frame having said control element and said power supply element mounted thereon and serving as an electrical conduction path; and
   a resin body that is formed by integrating said control element, said power supply element and said lead frame with one another;
   wherein any one of said sensor element, said control element and said power supply element is arranged at one side surface of said lead frame, with the remaining two being arranged on the other side surface of said lead frame.

2. The pressure sensor apparatus as set forth in claim 1, wherein said sensor element is arranged on a line perpendicular to a surface of said lead frame at a side of either said control element or said power supply element.

3. The pressure sensor apparatus as set forth in claim 1 or claim 2, wherein said lead frame comprises a circuit board having conductive patterns formed on opposite side surfaces thereof, and said control element is electrically connected with one of said conductive patterns on one side surface of said circuit board, with said power supply element being electrically connected with the other of said conductive patterns on the other side surface of said circuit board.

4. The pressure sensor apparatus as set forth in claim 3, wherein said circuit board comprises a flexible circuit board.

5. A pressure sensor apparatus comprising:
   a sensor element in the form of a gauge resistor arranged to be present in a medium, the pressure of which is to be detected, for detecting the pressure of the medium;
   a control element for controlling an electric signal from said sensor element;
   a power supply element for controlling an input from a power supply and a signal from said control element thereby to generate an output;
   a lead frame having said control element and said power supply element mounted thereon and serving as an electrical conduction path; and
   a resin body that is formed by integrating said control element, said power supply element and said lead frame with one another;
   wherein said lead frame has an exposure portion at which a portion thereof between said sensor element and said control element and between said sensor element and said power supply element is exposed outside, and said exposure portion is bent into a U-shaped configuration so that said sensor element is arranged to overlap with said control element and said power supply element.

6. The pressure sensor apparatus as set forth in any one of claim 1, 2, or 5, wherein said resin body is formed by integrating said control element, said power supply element and said lead frame with one another by means of insert molding.

7. A pressure sensor apparatus comprising:
   a sensor element in the form of a gauge resistor arranged to be present in a medium, the pressure of which is to be detected, for detecting the pressure of the medium;
   a control element for controlling an electric signal from said sensor element;
   a power supply element for controlling an input from a power supply and a signal from said control element thereby to generate an output;
   a terminal having said control element and said power supply element mounted thereon for outputting a signal from said power supply element to the outside; and
   a resin body that is formed by integrating said control element, said power supply element and said terminal with one another.

8. The pressure sensor apparatus as set forth in claim 7, wherein said resin body is formed by integrating said control element, said power supply element and said terminal with one another by means of insert molding.

9. The pressure sensor apparatus as set forth in claim 3, wherein said resin body is formed by integrating said control element, said power supply element and said lead frame with one another by means of insert molding.

10. The pressure sensor apparatus as set forth in claim 4, wherein said resin body is formed by integrating said control element, said power supply element and said lead frame with one another by means of insert molding.

11. The pressure sensor apparatus as set forth in claim 7, wherein there is no lead frame.

12. The pressure sensor apparatus as set forth in claim 11, wherein said power supply element and said control element are directly mounted on said terminal.

13. The pressure sensor apparatus as set forth in claim 7, wherein said power supply element and said control element are directly mounted on said terminal.

14. The pressure sensor apparatus as set forth in claim 13, wherein said terminal is of a one-piece construction and extends from a point of connection with either one of said power supply element and said control element to an outside of said resin body.

* * * * *